(12) United States Patent
Hubberstey et al.

(10) Patent No.: US 10,647,444 B2
(45) Date of Patent: May 12, 2020

(54) WING SLAT ACTUATOR DISCONNECTION DETECTION

(71) Applicant: Goodrich Actuation Systems Limited, Solihull, West Midlands (GB)

(72) Inventors: Mark Hubberstey, Stafford (GB); Mark Timms, Wolverhampton (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 228 days.

(21) Appl. No.: 15/851,805

(22) Filed: Dec. 22, 2017

(65) Prior Publication Data
US 2018/0178927 A1    Jun. 28, 2018

(30) Foreign Application Priority Data

Dec. 22, 2016   (EP) .................................... 16275181

(51) Int. Cl.
*B64D 45/00*         (2006.01)
*B64C 13/28*         (2006.01)
(Continued)

(52) U.S. Cl.
CPC ............ *B64D 45/0005* (2013.01); *B64C 9/22* (2013.01); *B64C 13/341* (2018.01); *B64F 5/40* (2017.01);
(Continued)

(58) Field of Classification Search
CPC .... B64C 9/22; B64C 3/00; B64C 9/34; B64C 13/16; B64C 3/58; B64C 1/26; B64C 21/10; B64C 9/24; B64C 13/36; B64C 9/06; B64C 13/506; B64C 13/26; B64C 9/12; B64C 7/02; B64C 23/06; B64C 35/003; B64C 37/00; B64C 1/06; B64C 3/22; B64C 3/10; B64C 3/14; B64C 39/024; B64C 39/10;
(Continued)

(56) References Cited

U.S. PATENT DOCUMENTS 4,753,402 A * 6/1988 Cole .......................... B64C 9/22
                                                         244/210
5,680,124 A    10/1997 Bedell
(Continued)

FOREIGN PATENT DOCUMENTS

| EP | 1088753 A2 | 4/2001 |
|---|---|---|
| EP | 2803584 A1 | 11/2014 |
| WO | 2011110833 A1 | 9/2011 |

OTHER PUBLICATIONS

European Search Report for Application No. 16275181.2-1754, dated Jun. 26, 2017, 8 Pages.

*Primary Examiner* — Behrang Badii
(74) *Attorney, Agent, or Firm* — Cantor Colburn LLP

(57) ABSTRACT

An actuator failure or disconnection detection device for an aircraft leading edge slat comprises a base and a biasing assembly mounted to the base and movable relative thereto. The base and biasing assembly are removably mountable between a fixed structure in the aircraft wing and the slat at an actuator location. The device further comprises an indicator for indicating the amount of movement of the biasing assembly in a direction towards the base when the slat is retracted towards the wing leading edge. The indicator may be a collar slidably mounted on the device.

4 Claims, 7 Drawing Sheets

(51) Int. Cl.
 *B64C 9/22* (2006.01)
 *B64F 5/40* (2017.01)
 *G07C 5/08* (2006.01)
 B64D 15/12 (2006.01)
 B64C 3/00 (2006.01)
 B64C 9/24 (2006.01)
 B64F 5/10 (2017.01)

(52) U.S. Cl.
 CPC .............. *G07C 5/0816* (2013.01); *B64C 3/00* (2013.01); *B64C 9/24* (2013.01); *B64D 15/12* (2013.01); *B64D 2045/001* (2013.01); *B64F 5/10* (2017.01)

(58) Field of Classification Search
 CPC ......... B64C 13/341; B64C 7/00; B64D 15/12; B64D 45/0005; B64D 29/02; B64D 33/04; B64D 27/02; B64D 27/24; B64D 37/30; B64D 2045/001; F16H 19/04; A47C 20/041; A47C 21/006; A47C 20/08; B60F 5/02; B29C 53/60; B29C 53/821; B29C 70/32; B29C 70/34; B29C 66/54; B29C 66/72141; B29C 53/828; B29C 66/63; B29C 65/56; B64F 5/10; B64F 5/40; G02C 1/06; G02C 5/008; G01B 11/14; A61H 7/001; A61H 23/02; A61G 7/0573; F02K 1/566; F02K 1/72; F02K 1/54; F02K 1/82; B63G 8/001; B29D 24/004; B29D 66/721; B29D 99/0028; B29D 12/02; B32B 3/20; G07C 5/0816

See application file for complete search history.

(56) References Cited

U.S. PATENT DOCUMENTS

| | | |
|---|---|---|
| 5,686,907 A | 11/1997 | Bedell |
| 6,466,141 B1 | 10/2002 | McKay et al. |
| 6,483,436 B1 | 11/2002 | Emaci et al. |
| 8,115,649 B2 | 2/2012 | Moy et al. |
| 8,646,346 B2 | 2/2014 | Hubberstey |
| 8,827,213 B2 | 9/2014 | Peirce |
| 9,102,398 B2 | 8/2015 | Vaghela |
| 9,199,743 B2 | 12/2015 | Thomas |
| 2003/0222170 A1* | 12/2003 | Wojciechowski ........ B64C 3/00 244/10 |
| 2007/0034747 A1* | 2/2007 | Amorosi ................... B64C 9/22 244/215 |
| 2011/0024566 A1* | 2/2011 | Soenarjo ................. B64D 15/12 244/131 |
| 2013/0153713 A1* | 6/2013 | Wilson ..................... B64C 9/22 244/214 |
| 2016/0001894 A1 | 1/2016 | Jones |
| 2016/0297541 A1 | 10/2016 | Anderson |
| 2018/0029691 A1* | 2/2018 | Gallien .................... B64C 9/14 |
| 2018/0162516 A1* | 6/2018 | Brown ..................... B64C 9/24 |

* cited by examiner

WING SLAT ACTUATOR DISCONNECTION DETECTION

FOREIGN PRIORITY

This application claims priority to European Patent Application No. 16275181.2 filed Dec. 22, 2016, the entire contents of which is incorporated herein by reference.

TECHNICAL FIELD

The present disclosure relates to the detection of actuator disconnection in deployable aircraft surfaces, in particular in wing leading edge slats.

BACKGROUND

Aircraft wings are frequently provided with lift augmentation surfaces which, when extended, increase the lift produced by the wing at a given speed. This allows, for example, an aircraft to take off in a shorter distance or land at a slower speed.

One such lift augmentation surface is a wing leading edge slat. The slat is mounted at a leading edge of the wing and is selectively extended and retracted by means of a suitable actuator mechanism, for example a rack and pinion drive. Due to the size of the slat, the slat is typically moved by more than one actuator, for example by a pair of actuators, spaced apart along the span of the wing. The actuators are operated together to move the slat.

It is possible that in use one of the actuators may fail or become decoupled from the slat. The slat is relatively stiff, so the remaining actuator may still be able to move the slat. The disconnection of the actuator may not however be detected by the aircraft system, as the slat still deploys. If this situation continues for a prolonged periods, damage may occur in the slat system, or the other actuator may become disconnected potentially leading to a catastrophic event.

It would therefore be desirable to provide a method and apparatus by which actuator disconnection can be detected at an early stage.

SUMMARY

From a first aspect, this disclosure provides a method of detecting actuator disconnection or failure in an aircraft leading edge slat system. The method comprises the steps of: extending a slat from an aircraft wing leading edge using at least two actuators; engaging a biasing assembly between a fixed structure in the aircraft wing and the slat at an actuator location, the biasing assembly biasing the slat in a direction away from the fixed structure; retracting the slat against the force of the biasing assembly; detecting a skew in the slat induced by the movement of the slat against the biasing force of the biasing assembly, the skew being indicative of an actuator disconnection or failure; and disengaging the biasing assembly from between the fixed structure and the slat.

Thus, in accordance with this aspect of the disclosure, a biasing assembly may induce skew in a slat by providing a biasing force in a direction which opposes retraction of the slat. A properly functioning slat actuator will be able to overcome the biasing force of the biasing assembly and move the slat a requisite distance. However, if an actuator has become disconnected or has failed, it will not be able to overcome the biasing force. The other, properly functioning actuator will still be able to move the slat, but due to the biasing force of the biasing assembly, the slat will skew, i.e. the end of the slat adjacent the disconnected or failed actuator will not move as far as the other end of the actuator. This skew is then detected to indicate an actuator disconnect or failure.

The skew may be detected by comparing the movement of the slat at respective actuator locations.

Alternatively the skew may be detected by measurement of the movement of the slat at an actuator location and comparing the measurement to a value which indicates proper actuator function.

The actuator location may be at an actuator track coupled to the slat and movable by the actuator.

This disclosure also provides an actuator failure or disconnection detection device for an aircraft leading edge slat. The device comprises a base and a biasing assembly mounted to the base and movable relative thereto. The base and biasing assembly are removably mountable between a fixed structure in the aircraft wing and the slat at an actuator location. The device further comprises an indicator for indicating the amount of movement of the biasing assembly in a direction towards the base when the slat is retracted towards the wing leading edge.

The biasing assembly may be is pivotally mounted to the base.

The biasing assembly may comprise one or more biasing elements mounted in a housing which is movable relative to the base and which is mountable to one of the fixed structure or slat.

The biasing elements may comprise one or more coil springs, for example nested coil springs.

The housing may be coupled to the base by a shaft, the housing being slidably mounted on the shaft to allow movement relative to the base.

The one or more biasing elements may be mounted between the shaft and the housing to bias the housing away from the base.

The indicator may comprise a collar slidably mounted on the shaft and moveable therealong by said housing.

The housing may comprise two housings spaced transversely from one another and joined by a saddle member which is mountable to one of the fixed structure or the slat.

The saddle member may comprise a fixing mechanism arranged intermediate said housings for attaching the biasing assembly to the fixed structure or slat.

The base may comprise a pair of arms which may be arranged on opposed sides of an actuator track and a retaining pin mountable between the arms for retaining the base to the track.

The base may comprise an interchangeable pad adapted to engage a particular area of the wing fixed structure.

BRIEF DESCRIPTION OF DRAWINGS

An embodiment of the disclosure will now be described by way of example only with reference to the accompanying drawings in which.

DETAILED DESCRIPTION

Figure 1:
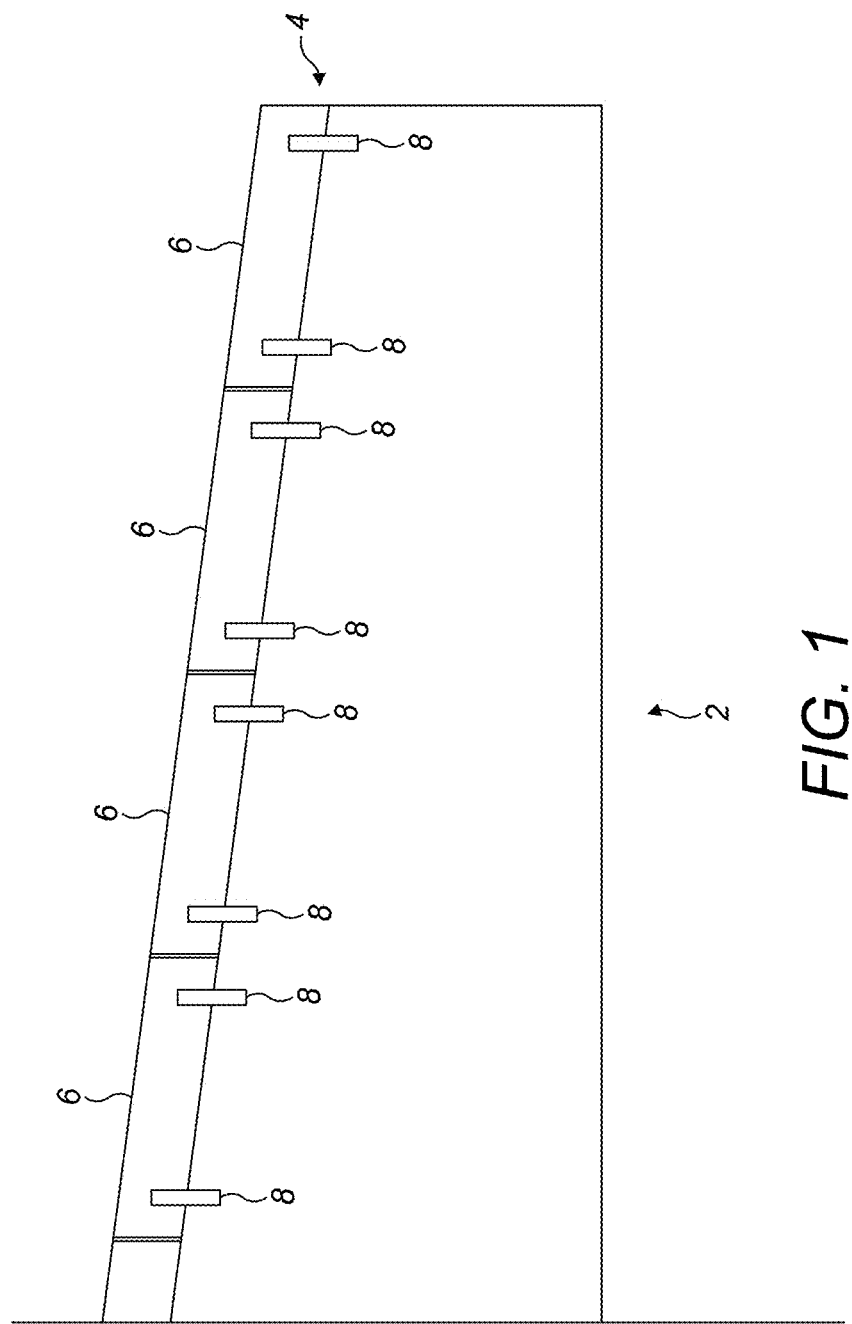
FIG. 1 illustrates an aircraft having a plurality of leading-edge slats formed on a wing thereof.

FIG. 1 illustrates an aircraft wing 2 having a leading edge 4. The leading-edge 4 is provided with a plurality of leading-edge slats 6. The slats 6 are selectively deployable from the leading edge 4 by actuators 8 mounted within the wing structure. When extended, the slats 6 increase the area of the wing 2 and provide additional lift, allowing the aircraft to take off in a shorter distance or to land at a slower speed.

Each slat 6 is moved by two actuators 8, one actuator arranged at either end of the slat 4. The actuator 8 may, for example, comprise a pinion drive, with a pinion wheel engaging a track (204, FIG. 7) attached to the slat 6 to extend and retract the slat 6 from the leading edge 4. The actuators 8 are operated together so as to move the slat 6 in the desired direction. During operation, one of the actuators 8 associated with a particular slat 6 may fail or disconnect from the slat 6. The slat 6 is relatively rigid and the actuator 8 sufficiently powerful to move the slat 6, although it is not desirable for this situation to continue for any length of time. Due to the rigidity of the slat 6, there will be little or no skew introduced in the position of the slat 6, meaning that existing on board skew detection systems may not detect the actuator disconnect. This disclosure provides a method and device which will allow detection of actuator failure or disconnection on the ground, for example during standard aircraft maintenance.

A device 20 in accordance with this disclosure is illustrated in FIGS. 2 to 6. The device 20 comprises a base 22 and a biasing assembly 24 pivotally mounted to the base 22. The base 22 is intended, in use, to engage with a fixed structure in the wing leading edge 4 and the biasing assembly engage with a track 204 of a slat actuator 8 as will be described further below.

The base 22 comprises a base element 26 to which the biasing assembly 24 is mounted and a replaceable pad 28 mounted to the base element 26 by screws or other fasteners 30. The pad 28 will, in use, engage the leading-edge fixed structure and is adapted to engage in a particular location on the leading-edge fixed structure corresponding to a particular actuator location. Thus, depending on the position along the leading edge 4 of the wing 2, a different pad 28 may be mounted to a base 26. This allows a common base 26 to be used, with a different pad 28 being used for different wing locations. To help ensure that, the correct pad 28 is being used at any particular position, the pad 28 may be provided with a marker 32 illustrating schematically the position on the leading edge at which the pad 28 is to be installed. Such a marker 32 can be seen in FIG. 2 for example.

Figure 6:
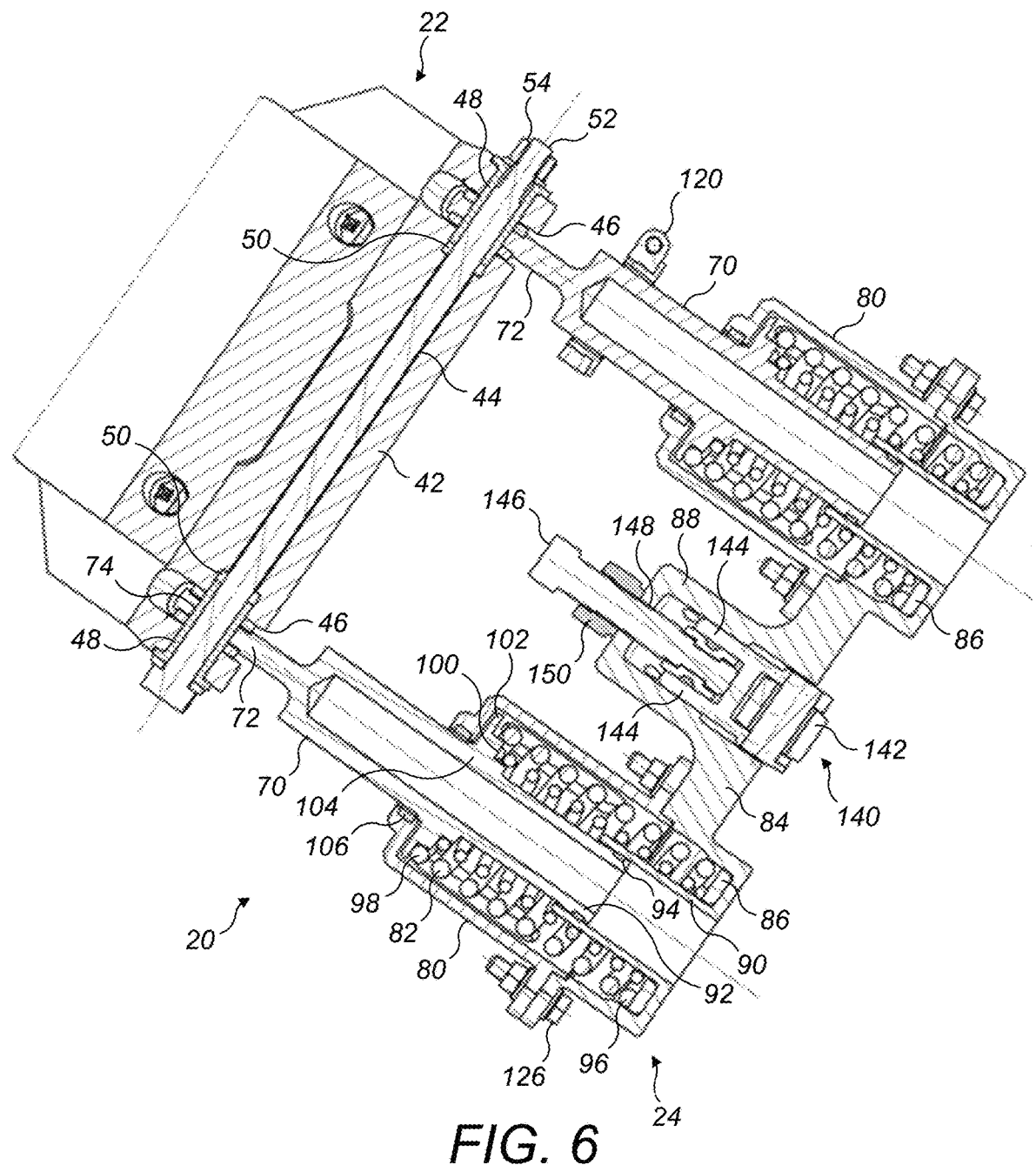
FIG. 6 shows a sectional view along line A-A of FIG. 5.

The base element 26 comprises a pair of arms 40 connected by a cross member 42. As can be seen in FIG. 6, the cross member 42 is formed with a through bore 44 and a pair of slots 46 intersecting the cross bore 44. Bushings 48 are mounted in counter bores 50 of the cross bore 44 to receive a mounting pin 52 for the biasing assembly 24. A nut 54 fastens the mounting pin 52 in position.

Figure 4:
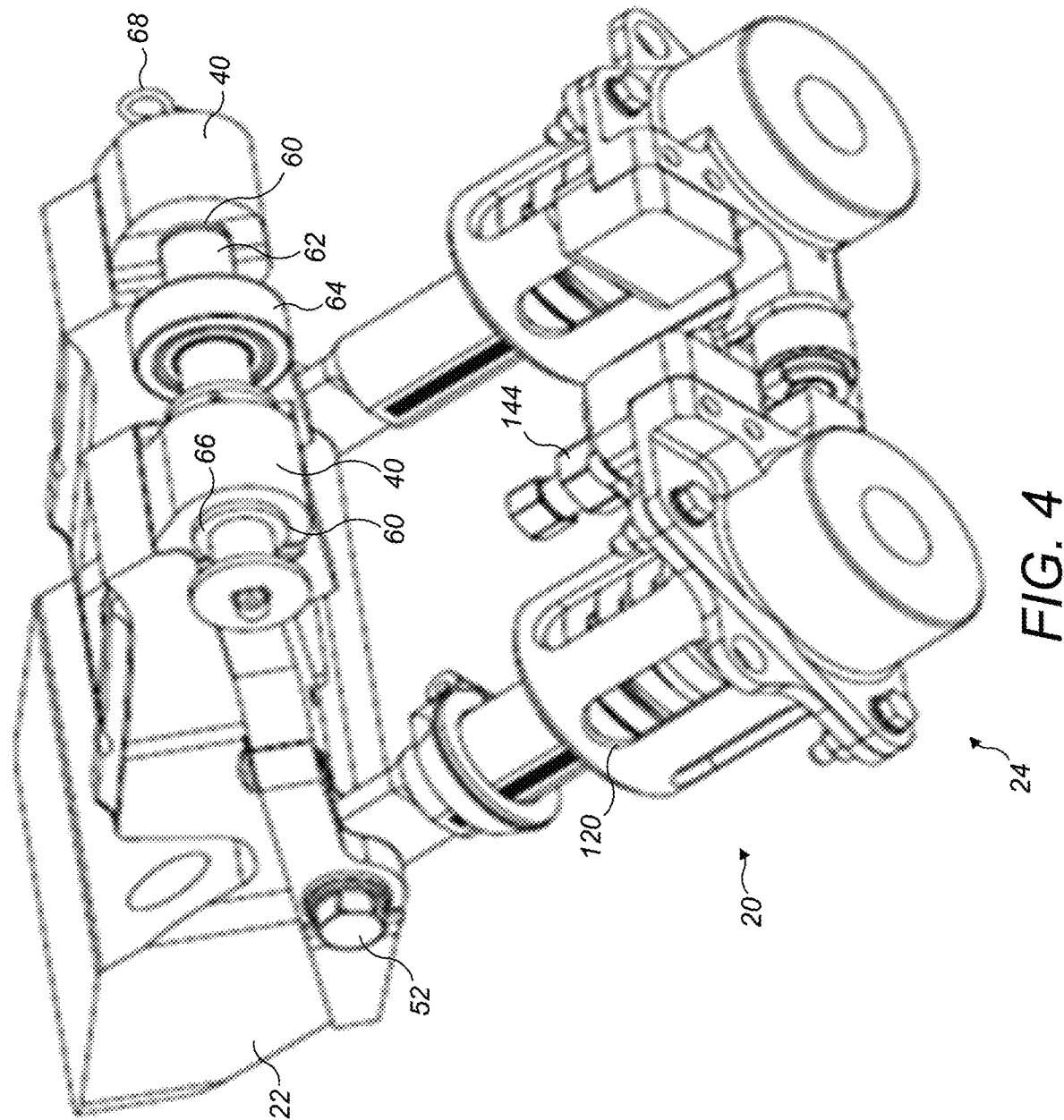
FIG. 4 shows a third perspective view of the device of FIG. 1.
Figure 5:
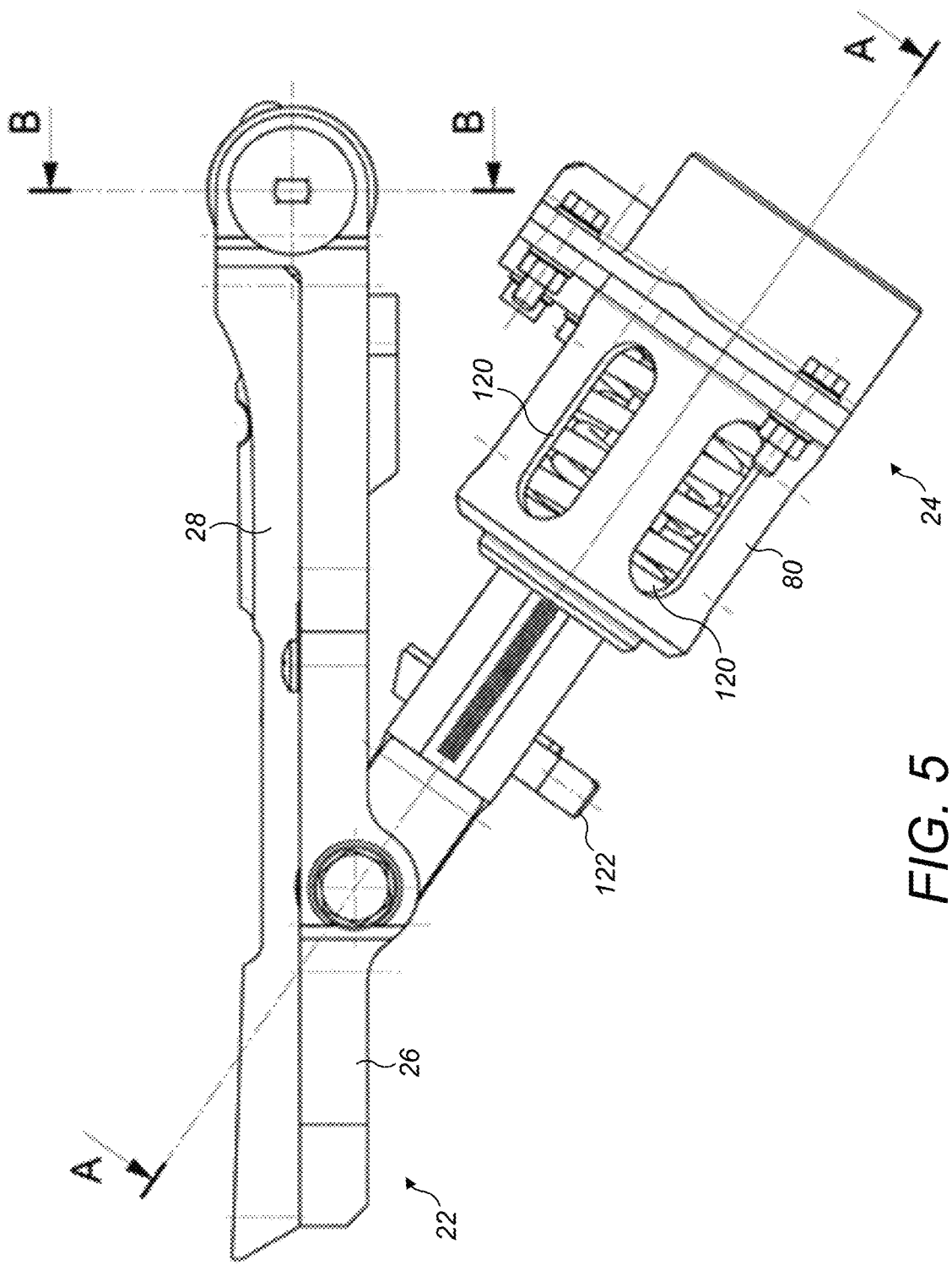
FIG. 5 shows a side view of the device of FIG. 1.

As shown in FIG. 4, the arms 40 of the base element 26 are formed with aligned bores 60 which removably receive a pin 62 mounting a roller 64. Bushings 66 may be provided in the openings 60 to receive the pin 62. The pin 62 may be retained by a locking pin 68 at one end of the pin 62. The function of the roller 64 will be described further below.

The biasing assembly 24 comprises a pair of shafts 70 having mounting lugs 72 formed at one end thereof. The mounting lugs 72 extend into the slots 46 provided in the base element 26 and are provided with openings 74 through which the bushing 48 and mounting pin 52 extend. The shafts 70 are thereby pivotally mounted to the base element 26.

The biasing assembly 24 further comprises a pair of housings 80 each receiving a biasing element 82. In this embodiment, the biasing element 82 comprises a pair of nested compression springs but other forms of biasing element, for example single springs or other resilient material may be used.

The housings 80 are connected by a saddle member 84 and mounted thereto by means of bolts 126 as illustrated although other fastenings may be used as appropriate.

The saddle member 84 comprises a pair of biasing element receiving wells 86 and a mounting block 88. The biasing element receiving wells 86 comprise a central post 90 which sealingly and slidingly receives one end 92 of a corresponding shaft 70. An O-ring or other seal 94 may be provided between the shaft 70 and the post 90.

First ends 96 of the biasing springs 82 are received at the bottom of the well 86, while second, opposite ends 98 of the biasing springs 82 are received on respective shoulders 100, 102 formed at an intermediate portion 104 of the shaft 70. The housing 80 covers the biasing element 82 and is slidably received on the shaft 70, with a seal 106 being provided therebetween.

Figure 2:
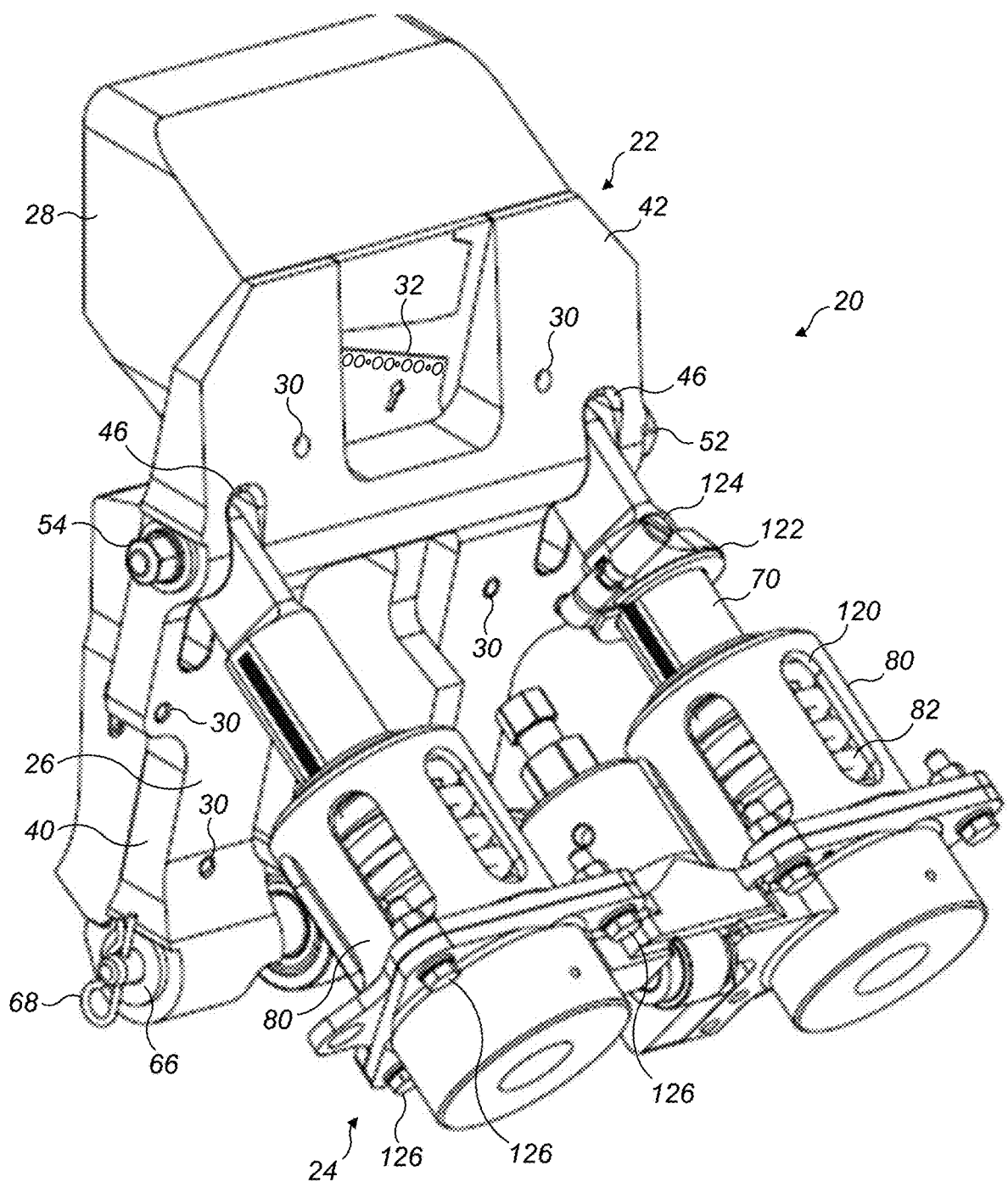
FIG. 2 shows a first perspective view of a device in accordance with the disclosure.
Figure 3:
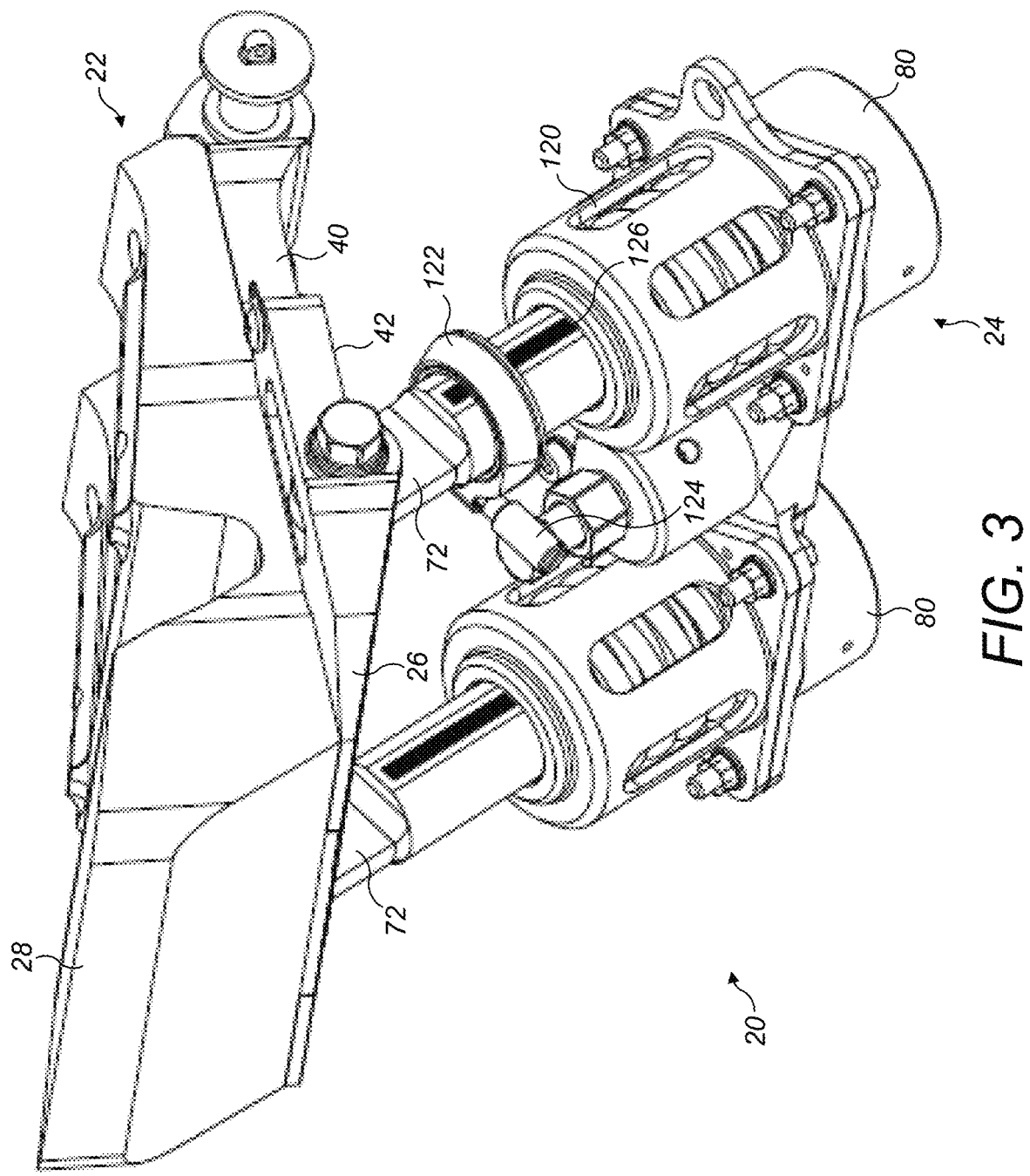
FIG. 3 shows a second perspective view of the device of FIG. 1.

As can be seen in FIG. 2, the housings 80 may be provided with elongated slots 120 or other openings which allow the biasing element 82 to be inspected without need for dismantling the biasing assembly 24.

A movement indicator 122 is mounted on one or both of the shafts 70 above the housing 80. In this embodiment, the indicator 122 comprises a collar which is slidably received on the shaft 70. The collar 122 may comprise a tightening element 124 which can be tightened to an appropriate value to avoid unintentional movement of the collar 122 on the shaft 70.

The shaft 70 is provided with a measurement scale 126 to allow the movement of the housing 80 along the shaft 70 to be measured. Additionally or alternatively, the shaft 70 may be provided with some other marking which indicates whether the movement falls within an acceptable range. For example, a first section of the shaft 70 adjacent the housing 80 may be delineated (for example by one colour, for example red) as indicating insufficient movement and a section nearer the base 22 may be delineated (for example by another colour, for example green) as indicating sufficient movement.

As discussed above, the cross member 84 is provided with a mounting block 88. The mounting block 88 slidably receives a mounting assembly 140 which comprises a roller element 142 slidably mounted in a bore 144. The roller 142 is mounted at a distal end of a slide element 144 attached to an adjustment screw 146 which is threadedly received in a threaded opening 148 in the base of the mounting block 88. A locking nut 150 is provided for locking the adjustment screw 146 in a desired position. As will be described further below, the mounting assembly 140 mounts the housing 80 to the slat 6.

Having described the general construction of the device 20, its installation and operation will now be described.

Figure 7:
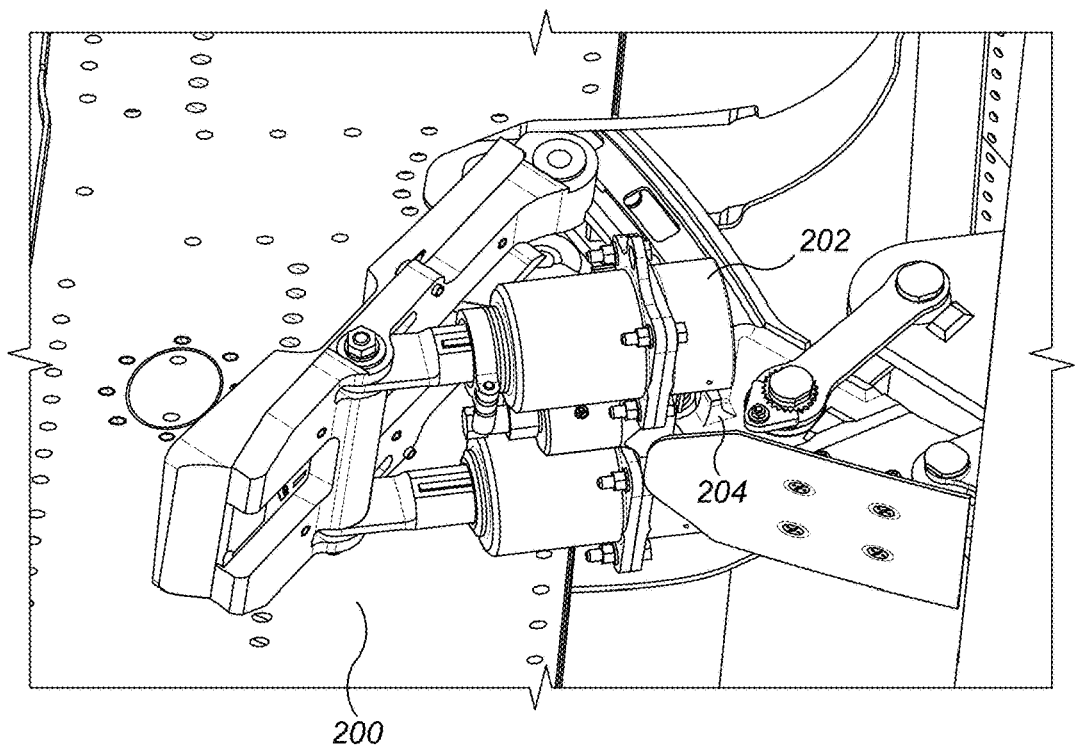
FIG. 7 shows a first step in the installation of the device of FIG. 1.

This device 20 illustrated has been adapted to be mounted in a D nose section 200 of a wing leading edge structure. This is illustrated in FIG. 7. The device 20 is adapted to engage around an actuator track 202 which is attached to a slat 6. The actuator track 202 is driven by a suitable mechanism such as a pinion (not shown) as is known in the art.

As a first step, the slat 6 whose operation is being tested is extended by a predetermined distance. An operator may then install a device 20 on one or each of the actuator tracks 202 operating the slat 6. Typically, a device 20 will be installed on both actuators tracks 202. The operator may easily check that the device is being installed in the correct location by reference to the marker 32 provided on the pad 28.

The pin 62 and roller 64 should be removed from the arms 40 of the base 6 to allow assembly. This is shown in FIG. 7. The roller 140 is of the biasing assembly mounting assembly 140 is then brought into contact with a location element 204 provided on the actuator track 202. This location element 204 may, for example, be an end stop provided on the track 202 which, in normal operation, will prevent over movement of the track 202 as it is being retracted. A temporary support, for example a strap may be assembled around the cross member 84 and the actuator track 202 to retain the device 20 in position at this stage.

Figure 8:
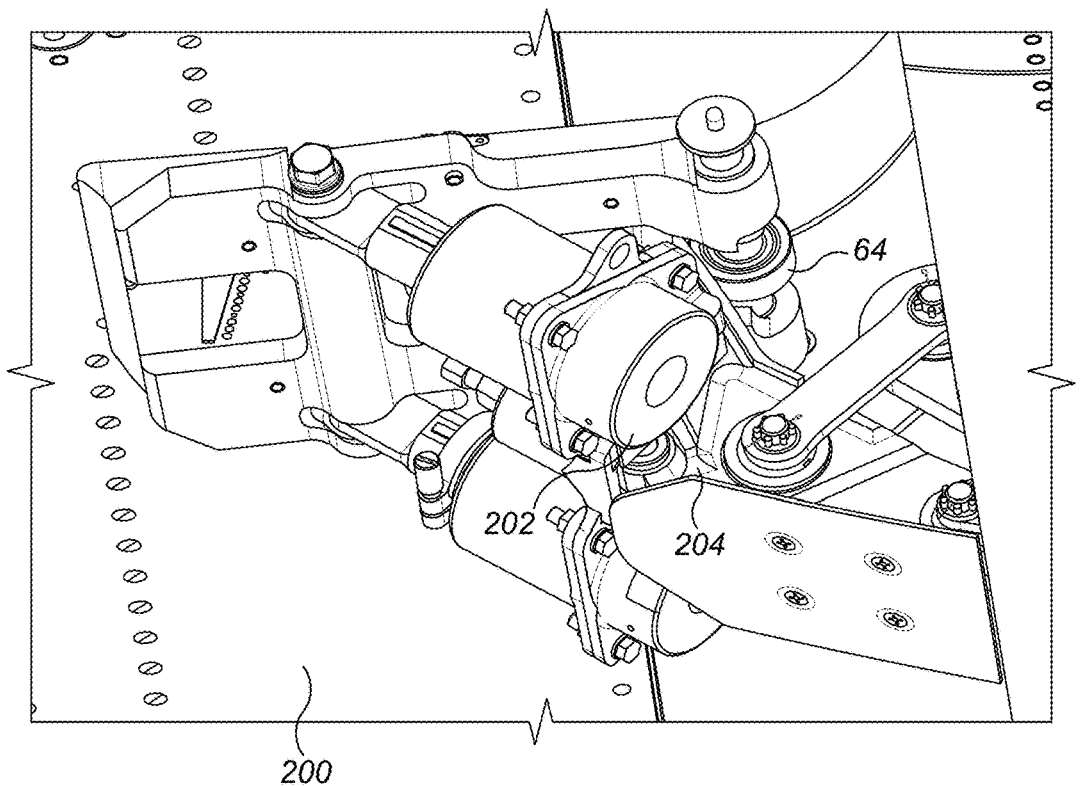
FIG. 8 shows the device of FIG. 1 in an installed condition.

The base 22 may then be swung upwardly (in the sense of the Figures) into contact with the D nose structure 200. This is facilitated by the roller 142 of the mounting assembly 140. The base element 26 is rotated such that the arms 40 thereof project over and beyond the actuator track 202 as illustrated in FIG. 8 and the pad 28 engages the D nose structure 200. In this position, the pin 62 and roller 64 may be inserted into the bores 60 in the arms 40 such that the roller 64 may engage the slat track 202 as illustrated. The device 20 is then secured in position by the operator tightening the adjustment screw 148 of the mounting assembly 140 such that the roller 140 thereof firmly engages the location element 204 on the track 202. Any temporary retaining straps may be removed at this stage.

The indicator collar 122 is then moved into engagement with an end surface of the housing 80 and the tightening element 124 tightened to the extent that the collar 122 is retained in position but is still able to slide along the shaft 70.

Once the device(s) 20 are installed, the slat 6 is retracted a predetermined amount using the actuators 8. For example, the slats 6 may be retracted from a first extended position to a second, less extended position. As the slat 6 retracts, the housing 80 of the biasing assembly 24 will be moved towards the base 22 by virtue of the engagement of the roller 140 with the track location element 204. As the housing 80 moves, it moves the indicator collar 122 along the shaft 70 to provide an indication of the amount of movement. This movement can be read by the operator. The retraction occurs against the biasing force of the springs 82 which will tend to bias the slat 6 away from the D nose structure 200.

In a situation where both actuators 8 coupled to the slat 6 are connected to the slat 6 and functioning properly, the actuators 8 will retract the ends of the slat 6 by the same distance, as the actuators 8 are both able to counteract the biasing force of the springs 82. However, if only one of the actuators 8 is connected and/or functioning properly, it alone will act to retract the slat 6. As mentioned above, since the slat 6 is relatively rigid, the single actuator 8 will act to retract the slat 6. That actuator 8 will overcome the biasing force of the springs 82 of the device 20 arranged at its location. However, the actuator 8 will not be able to overcome fully the biasing force of the springs 82 in the device 20 mounted at the disconnected/non-functional actuator location, which will lead to a skew being introduced into the slat 6. In this condition, the movement of the housing 80 along the shaft 70 of that device 20 will not be as great as the movement of the housing along the shaft in the other device 20.

This difference in movement can be detected, for example by comparing the movement of the two indicators 122, a difference over a predetermined value being indicative of an actuator disconnect or failure. Alternatively the absolute movement of an indicator 122 can be used to provide such an indication. Thus, if the indicator 122 moves less than a predetermined distance along the shaft 70 (which may be suitably marked on the shaft as discussed above), an operator will know that the relevant actuator is not functioning or is disconnected from the slat 6.

After the indicator 122 has been inspected, the device(s) 20 may be removed from around the actuator track 202 by loosening the tightening screw 148 and removing the retaining pin 62 from the base element 26. The slat 6 may then be returned to its normal retracted position. If actuator failure/disconnection is detected, the actuator 8 may be replaced as appropriate.

Thus the disclosure provides a method of detecting actuator disconnection or failure in an aircraft leading edge slat system by detecting skew induced by a biasing member 82 which opposes retraction of the slat 6. As can be seen, the method broadly comprises the steps of extending the slat 6 from an aircraft wing leading edge 4 using at least two actuators 8. A biasing member 82 is installed between a fixed structure, for example a D-nose structure 200 in the aircraft wing 4 and the slat 6 at an actuator location, for example at an actuator track 202. The biasing member 82 biases the slat 6 in a direction away from the fixed structure in a direction opposing retraction of the slat 6. The slat 6 is then retracted by the actuators 8 against the force of the biasing member 82. Should one of the actuators 8 be non-functional or disconnected, a skew will be induced in the slat 6 by the biasing member 82 which can be detected.

While a particular embodiment has been described above, it will be appreciated that various modifications may be made thereto without departing from the scope of the disclosure.

For example, while the device 20 has been shown with two housings 80, it may be possible to provide a biasing assembly with just one such housing 80. The embodiment illustrated however, has the advantage of facilitating mounting of the device 20 to an actuator track 202.

In addition, the biasing elements 82 may take a different form. For example, each biasing element may comprise a single compression spring rather that the nested spring pair illustrated. The nested spring arrangement may be advantageous, however, in that it may allow a relatively high spring force to be applied in a relatively compact arrangement. Other forms of resilient biasing elements 82 may also be provided. In addition, other forms of biasing mechanisms such as pneumatic or hydraulic biasing mechanisms may be employed.

In the embodiment illustrated, the skew indicator is incorporated into the device 20 as a movable collar 122. Of course other forms of indicator 122 could be used. The indicator 122 need not be provided on the device and could be provided remotely therefrom and connected to it by suitable means. For example the device 20 may comprise a displacement sensor whose output is transmitted to an external device.

The invention claimed is:

1. A method of detecting actuator disconnection or failure in an aircraft leading edge slat system comprising the steps of:
    extending a slat from an aircraft wing leading edge using at least two actuators;
    engaging a biasing assembly between a fixed structure in the aircraft wing and the slat at an actuator location, the biasing assembly biasing the slat in a direction away from the fixed structure;
    retracting the slat against the force of the biasing assembly;
    detecting a skew in the slat induced by the movement of the slat being opposed by the biasing assembly; and
    disengaging the biasing assembly between the fixed structure and the slat.

2. A method as claimed in claim 1, wherein the skew is detected by comparing the movement of the slat at respective actuator locations.

3. A method as claimed in claim 1, wherein the skew is detected by measurement of the movement of the slat at an actuator location and comparing the measurement to a value which indicates proper actuator function.

4. A method as claimed in claim 1, wherein the actuator location is at an actuator track coupled to the slat and movable by the actuator.

* * * * *